(12) United States Patent
Benedetti

(10) Patent No.: US 12,358,726 B2
(45) Date of Patent: Jul. 15, 2025

(54) STATION FOR THE CONVEYANCE AND MEASUREMENT OF HORTICULTURAL PRODUCTS

(71) Applicant: UNITEC S.P.A., Lugo (IT)

(72) Inventor: Luca Benedetti, Frazione Savarna (IT)

(73) Assignee: UNITEC S.P.A., Lugo (IT)

( * ) Notice: Subject to any disclaimer, the term of this patent is extended or adjusted under 35 U.S.C. 154(b) by 0 days.

(21) Appl. No.: 18/682,283

(22) PCT Filed: Jul. 27, 2022

(86) PCT No.: PCT/EP2022/071074
§ 371 (c)(1),
(2) Date: Feb. 8, 2024

(87) PCT Pub. No.: WO2023/016806
PCT Pub. Date: Feb. 16, 2023

(65) Prior Publication Data
US 2024/0375877 A1  Nov. 14, 2024

(30) Foreign Application Priority Data

Aug. 10, 2021 (IT) .................. 102021000021629

(51) Int. Cl.
*B65G 13/08* (2006.01)
*A23N 15/00* (2006.01)
(Continued)

(52) U.S. Cl.
CPC ............. *B65G 13/08* (2013.01); *A23N 15/00* (2013.01); *B07C 5/3422* (2013.01); *B07C 5/36* (2013.01);
(Continued)

(58) Field of Classification Search
CPC .... B07C 5/10; B07C 5/16; B07C 5/20; B07C 5/3422; B07C 5/36; G01G 5/006; G01G 11/06
(Continued)

(56) References Cited

U.S. PATENT DOCUMENTS 3,606,014 A * 9/1971 Linn ...................... B07C 5/3404
209/591
4,306,629 A   12/1981 Powell
(Continued)

FOREIGN PATENT DOCUMENTS

DE   1549215 A1   2/1971
ES   1095980 U   12/2013

OTHER PUBLICATIONS

International Search Report for International Application No. PCT/EP2022/071074, dated Oct. 27, 2022, 4 pages.
(Continued)

*Primary Examiner* — Michael McCullough
*Assistant Examiner* — Molly K Devine
(74) *Attorney, Agent, or Firm* — CANTOR COLBURN LLP

(57) ABSTRACT

A station for the conveyance and measurement of horticultural products, having elements for the movement and support, along a predefined trajectory, of a horticultural products, which can be arranged in series so that they rest on the movement and support elements. The conveyance and measurement station includes at least one primary dispenser of pressurized fluid, configured to direct a continuous or intermittent jet of the fluid toward the predefined trajectory, and an apparatus for measuring at least one parameter which represents the extent of the deviation imposed by the jet on each product in transit, with respect to the predefined trajectory, for the consequent indirect verification of the
(Continued)

weight and/or of the specific gravity of the respective product, correlated with the extent of the deviation.

10 Claims, 6 Drawing Sheets

(51) Int. Cl.
    *B07C 5/342*     (2006.01)
    *B07C 5/36*     (2006.01)

(52) U.S. Cl.
    CPC .. *A23N 2015/008* (2013.01); *B07C 2501/009* (2013.01); *B65G 2201/0202* (2013.01)

(58) Field of Classification Search
    USPC ......... 209/591, 592, 645; 73/1.33, 433, 444, 73/448, 451; 177/177, 207
    See application file for complete search history.

(56) References Cited

U.S. PATENT DOCUMENTS

| | | |
|---|---|---|
| 8,714,365 B2 | 5/2014 | Morley |
| 2011/0186405 A1* | 8/2011 | Blanc .................... B65G 47/61 |
| | | 198/867.02 |
| 2020/0179984 A1 | 6/2020 | Benedetti |

OTHER PUBLICATIONS

Italian Search Report for Application No. 202100021629, dated Mar. 31, 2022, 7 pages.
Written Opinion for International Application No. PCT/EP2022/071074, dated Oct. 27, 2022, 5 pages.

* cited by examiner

STATION FOR THE CONVEYANCE AND MEASUREMENT OF HORTICULTURAL PRODUCTS

CROSS-REFERENCE TO RELATED APPLICATIONS

This application is a 35 U.S.C. § 371 National Stage patent application of PCT/EP2022/071074, filed on 27 Jul. 2022, which claims the benefit of Italian patent application 102021000021629, filed on 10 Aug. 2021, the disclosures of which are incorporated herein by reference in their entirety.

TECHNICAL FIELD

The present disclosure relates to a station for the conveyance and measurement of horticultural products.

BACKGROUND

As is known, in the field of the packaging and distribution of fruit and horticultural products in general, the use of at least partially automated apparatuses or lines, designed and sized to perform a plurality of operations and treatments on a specific type of horticultural product, is now widespread.

Automation allows to manage in a short time and with low costs the great quantities of product necessary to satisfy the market demand, in compliance with the increasingly high quality standards imposed by institutions and by the consumers.

In greater detail, therefore, such apparatuses are provided with means for conveying the horticultural products of interest, which move said products along a predefined path in order to subject them to various treatments by stations and devices arranged along said path.

In greater detail, usually, at the beginning of the path there is a loading station, which is fed with unsorted masses of a specific fruit (or other horticultural product), often coming directly from the harvesting fields.

Among the other stations provided downstream, there is typically at least one which, for each product in transit, is assigned to measuring one or more parameters of interest, such as for example color, shape, size, sugar content, ripeness, any decay, or weight.

Subsequently, the products are sent to a final region where two or more unloading devices, which are associated with respective collection containers, can be selectively activated by an electronic unit, depending on the readings performed by the measurement station.

In this manner, homogeneous masses of products are accumulated in each collection container, since all and only those products for which the parameter of interest assumes a predetermined value or range of values are sent to each of them.

In this context, the particularities of each fruit or horticultural product pose problems that are different every time and often not easy to solve for manufacturer companies, which are instead seeking solutions that allow an increase in line productivity without penalizing the quality of the product and the measurements made.

In particular, a complex challenge is certainly offered by nuts: as is known, sometimes the kernel (the edible part of the fruit) unpredictably does not grow or grows incompletely. A nut having such a defect, however, is visually indistinguishable from the others: the shell is intact and it is not possible to identify externally other signs indicative of the erroneous (failed or incomplete) growth of the kernel.

Any weighing of the nuts, to investigate indeed the size of the kernel inside, is also very problematic, because systems known for this purpose are often structurally complex and poorly suited to combine the sensitivity required to weigh accurately light fruits such as nuts with the speed of measurement imposed by the need to maintain high productivity (which is understood as the number of fruits processed in the unit time).

In practice, therefore, nuts that are defective in this manner cannot be easily identified and are processed by the line like the others, and they too end up accumulating in the collection containers together with the good quality ones, and are in any case an unwelcome surprise for the end user.

SUMMARY

The present disclosure solves the problems described above, providing a conveyance and measurement station that allows to identify an incorrect growth of the kernel of nuts and/or other horticultural products quickly and accurately.

Within this aim, the disclosure provides a station and an apparatus that allow the weighing of nuts and other horticultural products, ensuring at the same time rapidity and suitable precision of measurement, with a structurally simple solution.

the disclosure also provides a station and an apparatus capable of easily identifying flaws that are otherwise not easily detectable in nuts and other horticultural products.

the disclosure further provides a station and an apparatus that ensure high reliability in use.

The disclosure proposes a station that uses a technical and structural configuration that is alternative to those of stations of the known type.

The disclosure also provides a station that can be obtained easily starting from commonly commercially available elements and materials.

Yet another advantage of the disclosure is to provide a station that has low costs and is of assured application.

This aim and these and other advantages that will become better apparent hereinafter are achieved by a station according to the claims and by an apparatus according to the claims.

BRIEF DESCRIPTION OF THE DRAWINGS

Further characteristics and advantages of the disclosure will become better apparent from the description of a preferred but not exclusive embodiment of the station and of the apparatus according to the disclosure, illustrated by way of non-limiting example in the accompanying drawings, wherein.

DETAILED DESCRIPTION OF THE DRAWINGS

Figure 1:
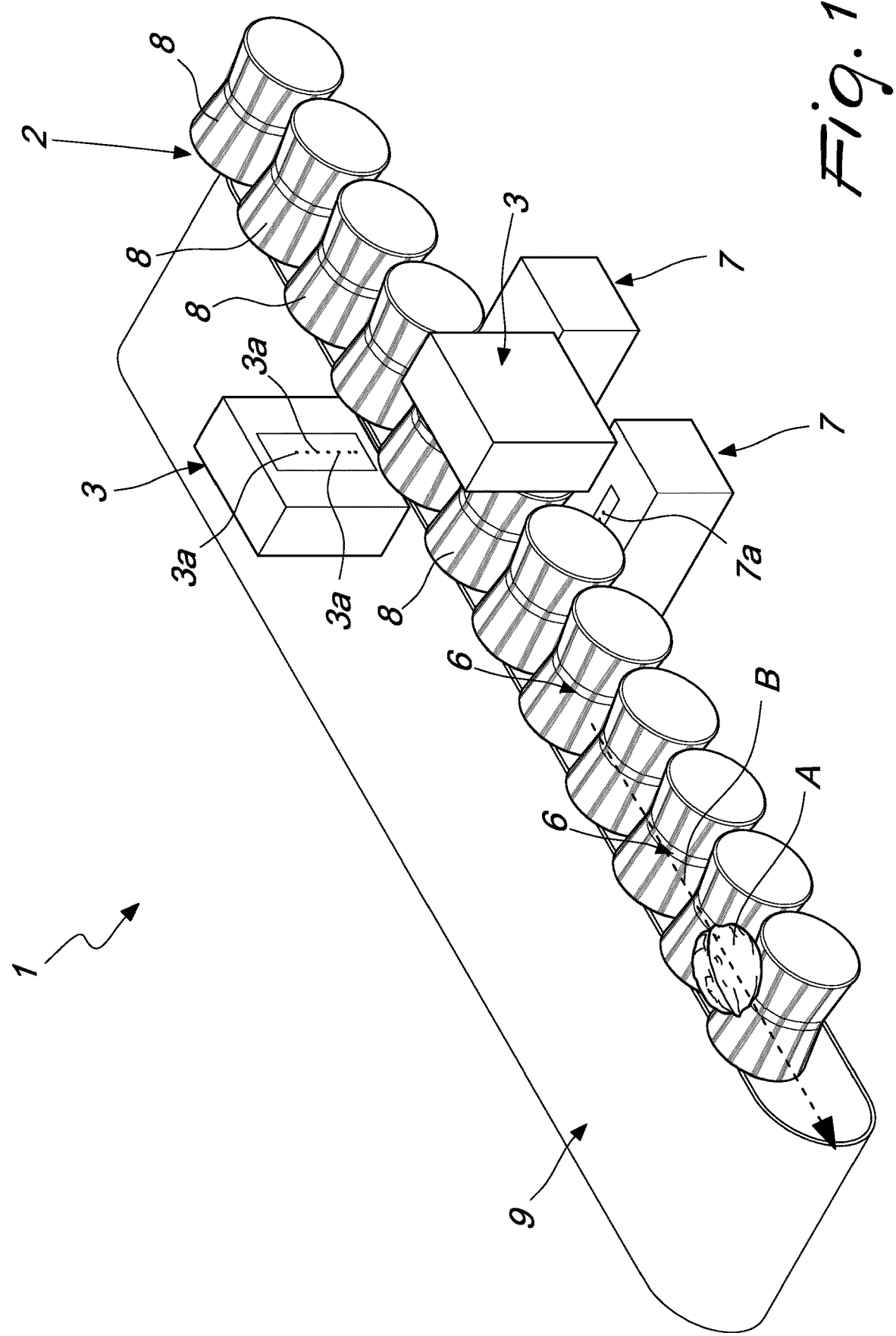
FIG. 1 is a perspective view of the station according to the disclosure.

With particular reference to the figures, a station for the conveyance and measurement of horticultural products A is generally designated by the reference numeral 1.

Typically, the conveyance and measurement station 1 is conceived and sized for a specific type of horticultural product A, but in any case the possibility that the same conveyance and measurement station 1 may treat different types of products A (at the same time or, especially, in different production cycles), especially if similar in terms of shape, dimensions and/or technical problems they pose for manufacturers, falls within the protective scope claimed herein.

It is also appropriate to note that the conveyance and measurement station 1 can find application in relation to any horticultural product A (fruits, greens, vegetables, etcetera), without thereby abandoning the protective scope claimed herein. At the same time, in the preferred application the product A is a nut or other product A having in any case small dimensions and weight and for which one seeks to obtain, in the particular manners that will be shown, an estimate of the weight, of the specific gravity and/or information on flaws otherwise not detectable (or in any case difficult to identify).

The conveyance and measurement station 1 can be used in any context and within lines for processing products A of any type, without thereby abandoning the protective scope claimed herein. At the same time, in any case an example of application of the conveyance and measurement station 1 of considerable practical interest will be provided in any case hereinafter, by way of non-limiting example of the disclosure.

Figure 2:
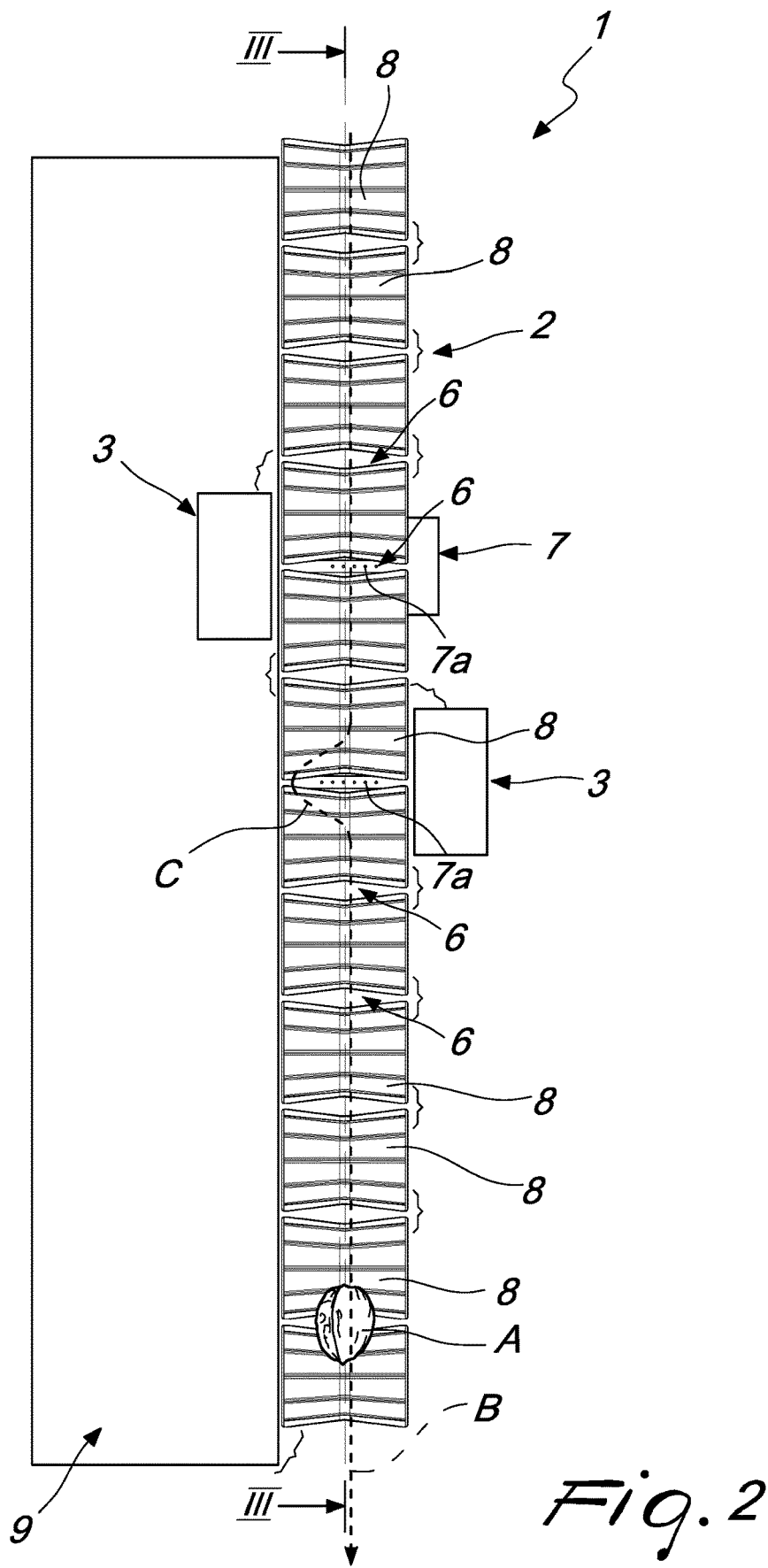
FIG. 2 is a top view of the station of FIG. 1.

The conveyance and measurement station 1 comprises means 2 for the (cyclic) movement and support, along a predefined trajectory B (which is shown for the sake of simplicity only in FIGS. 1 and 2), of a plurality of horticultural products A, which can be arranged in series so that they rest on said movement and support means 2.

The movement means 2 are therefore configured to receive progressively and convey a row of horticultural products A, aligned along the advancement direction (the predefined trajectory B) imposed by said movement means 2. By virtue of the simple resting arrangement, the movement means 2 contrast the fall to the ground by gravity of the products A and can move them along the predefined trajectory B, but at most they offer only partial hindrance to displacements on the resting surface that they themselves define (it will be evident hereinafter that this condition is fundamental for the operation of the disclosure).

The manners in which the products A are delivered to the movement means 2 can be any, according to the requirements and/or the state of the art.

According to the disclosure, the conveyance and measurement station 1 comprises at least one primary dispenser 3 of pressurized fluid, which is configured to direct a continuous or intermittent jet (stream) of the fluid toward the predefined trajectory B. The pressurized fluid can be any (and therefore any liquid or gas), but in the preferred (non-exclusive) embodiment, the primary dispenser 3 comprises appropriate components and connectors in order to define a sort of pneumatic circuit, which leads to the predefined trajectory B and is fed by a source of compressed air (which indeed constitutes the pressurized fluid). The primary dispenser 3 can be kept constantly active during the transit, along the predefined trajectory B, of the products A or be adequately synchronized with the advancement of said products, in order to ensure intermittent operation (and usefully limit consumption). In any case, the jet must be able to strike each product A during its transit (without making it fall).

Furthermore, according to the disclosure the conveyance and measurement station 1 comprises at least one apparatus 4 for measuring at least one parameter which represents the extent of the deviation imposed by the jet on each product A in transit, with respect to the predefined trajectory B, in order to obtain consequently an indirect measurement (or at least an estimate) of the weight and/or of the specific gravity of the respective product A, which are in fact evidently correlated to the extent of the deviation.

In other words, first of all the primary dispenser 3 and the jet are configured so that the thrust imposed on the product A is not so intense as to cause it to fall from the movement means 2 but is still sufficient to cause an appreciable displacement, at least in those products A that for some reason have a lower weight than expected (the products A with a weight similar to the expected one might not be displaced at all, although typically heavier products A also will undergo an albeit slight displacement). The direction of the jet can be any, provided that indeed it is suitable to generate a displacement detectable by the apparatus 4 in the products A that are defective or have a lower than expected weight/specific gravity.

The extent of the displacement or deviation is obviously correlated to the weight and/or specific gravity of the product A, and therefore the measurement of the extent of the displacement can easily be translated into a measurement or at least an estimate of the weight and/or specific gravity of said product A.

It should be noted in this respect that nuts that enclose, within the shell, a kernel that has not fully grown (or are without a kernel) indeed have a lower weight (for the same volume) and/or a specific gravity than those that are fully grown: the indirect measurement thus performed allows therefore to easily identify the nuts with a kernel that is not fully grown or in any case products A that have such flaws as to reduce the weight and/or the specific gravity (compared to what is expected), in any case achieving already at this point the intended purpose.

In particular, the apparatus 4 comprises at least one electronic vision device 5 (which comprises a video camera, for example), provided with instructions (for example software) for the analysis of the acquired images, analysis which is indeed aimed at measuring the cited parameter. The choice of the apparatus 4 or of the electronic device 5 can also fall on those already known solutions that allow to analyze acquired images by means of suitable software in order to detect their data and useful information.

Figure 3:
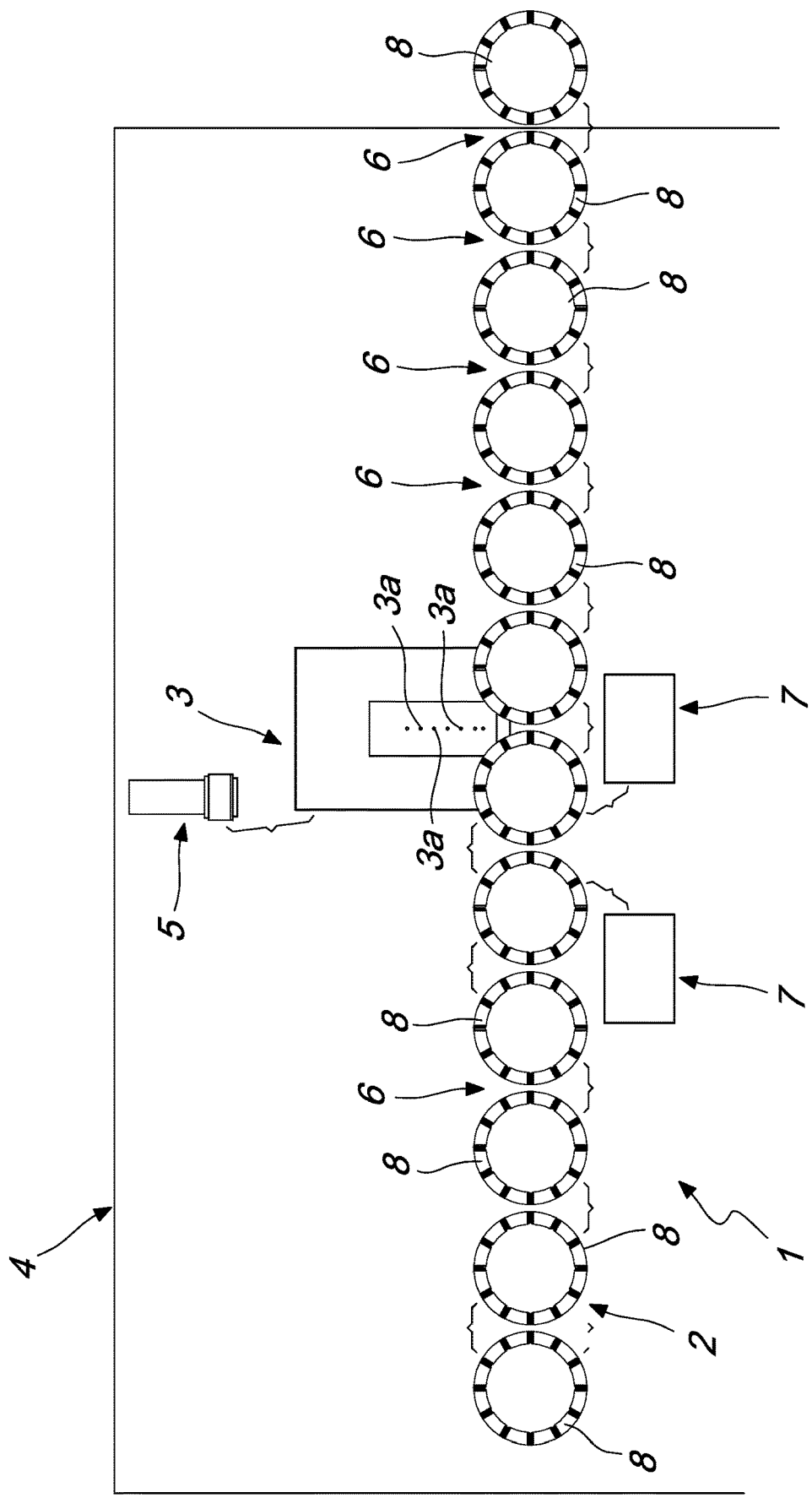
FIG. 3 is a sectional view of FIG. 2, taken along the plane III-III.
Figure 4:
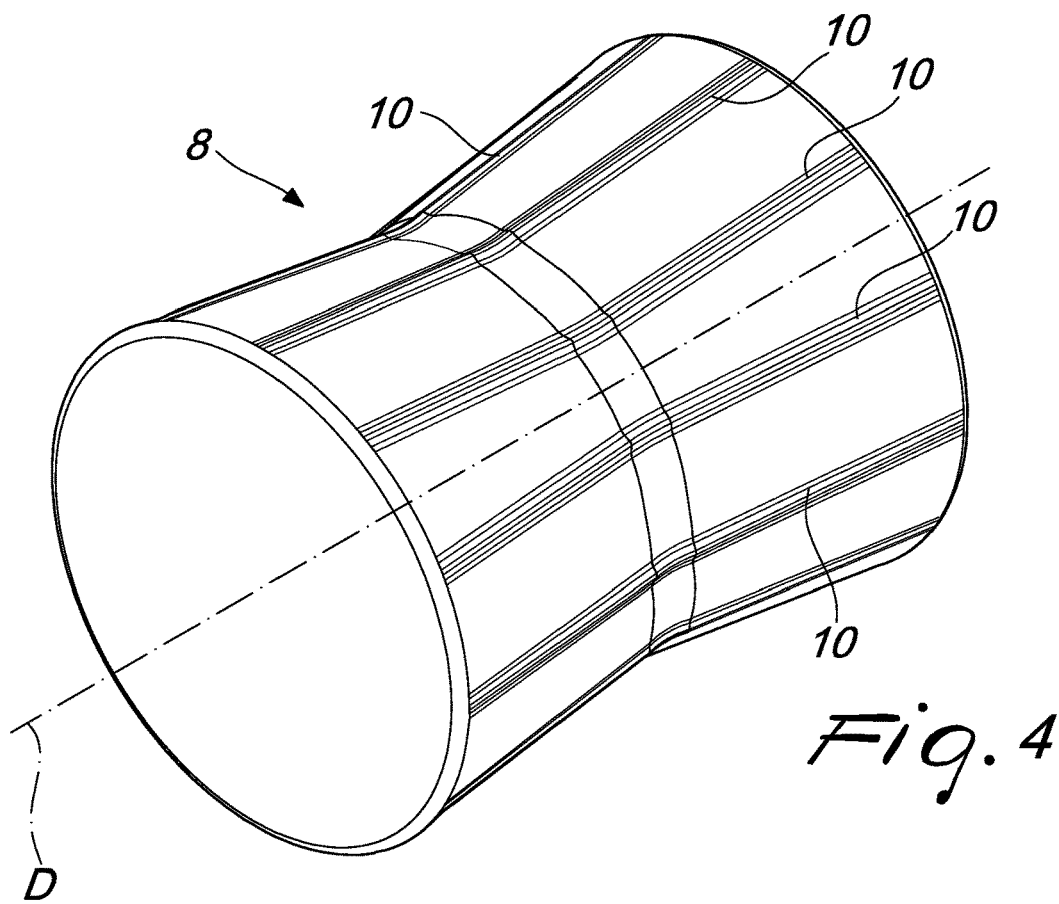
FIG. 4 is a perspective view of an element of the movement and support means.
Figure 5:
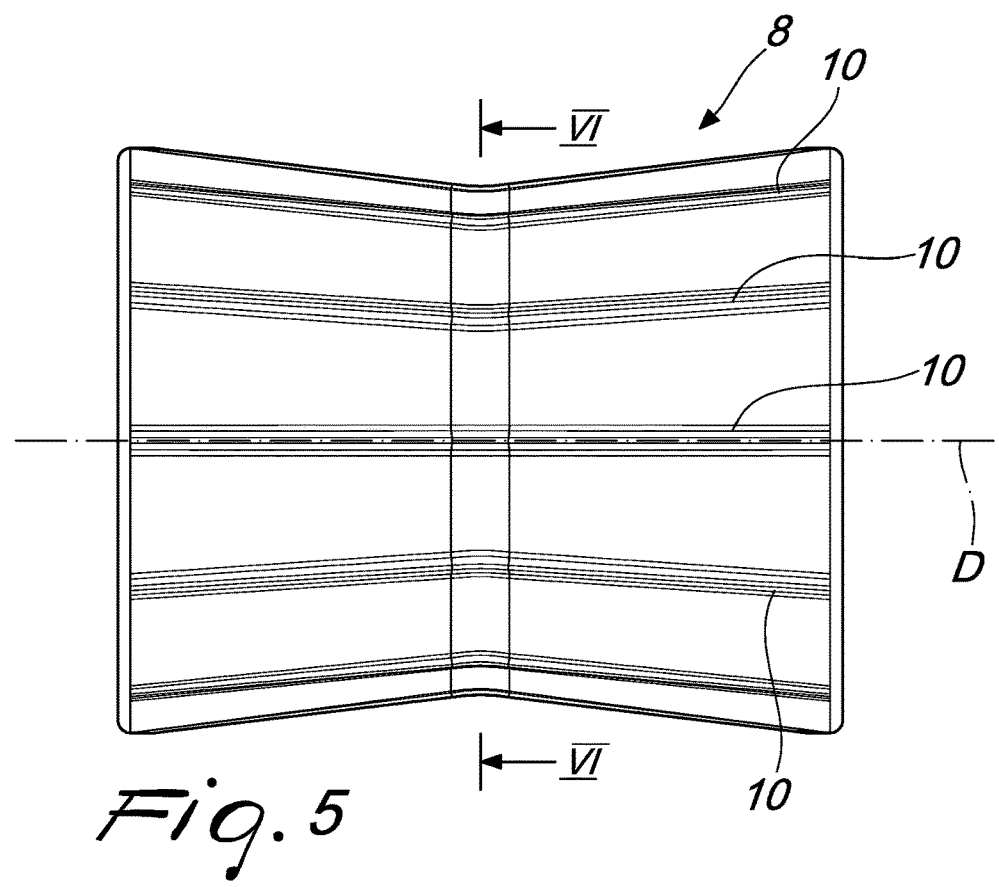
FIG. 5 is a lateral elevation view of the element of FIG. 4.
Figure 6:
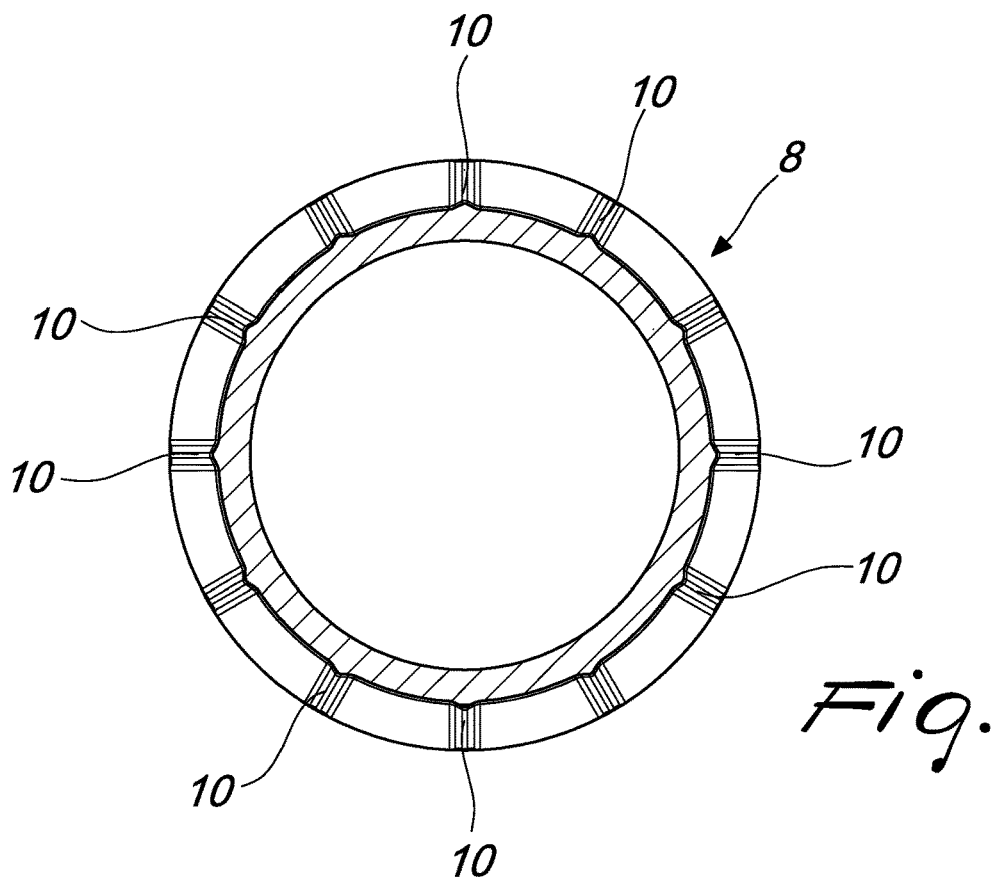
FIG. 6 is a sectional view of FIG. 5, taken along the plane VI-VI.
Figure 7:
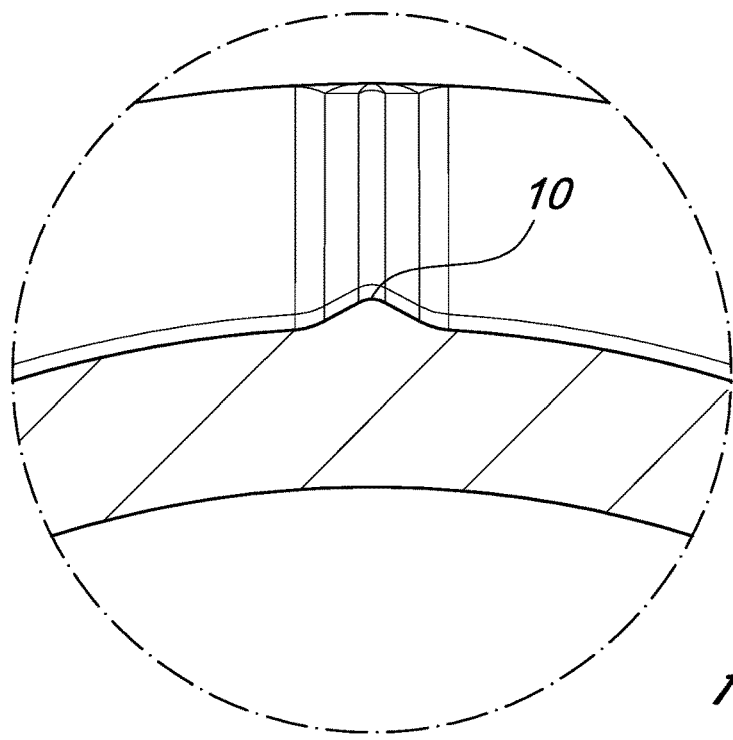
FIG. 7 is a highly enlarged-scale view of a detail of FIG. 6.

A possible example of apparatus 4 provided with a video camera is shown schematically only in FIG. 3 (for the sake of simplicity): in any case, it is specified that the protective scope claimed herein includes any apparatus 4 capable of measuring in any manner the extent of the deviation imposed to the product A by the jet. Such apparatus 4 can also comprise or be associated with a computer or with a control unit capable of performing the analysis of the acquired images and/or in any case of correlating the deviation with the weight and/or specific gravity of the product A or in any case to use also downstream the information regarding the extent of the deviation, so as to manage in a different manner the products A indeed as a function of the indirect measurement performed by the conveyance and measurement station 1.

Usefully, in the preferred embodiment (which in any case does not limit the application of the disclosure), the movement means 2 form resting seats 6 in stable equilibrium for the horticultural products A; in this case, preferably the primary dispenser 3 is configured to impose with the respective jet a (merely) temporary deviation from the predefined trajectory B.

It should be noted that in the present description, stable equilibrium is a concept to be understood with the meaning of physics or classical mechanics, according to which a body (in this case the product A) is in stable equilibrium if, when moved slightly it from its equilibrium position (from the seat 6), it tends naturally to return to it (by gravity).

In practice, therefore, each product A is arranged in a lowered position with respect to the immediate vicinity, so that the push imposed by the jet is only sufficient to move the product A temporarily, letting it return by gravity to the seat 6 in a downstream portion after passing the region affected by the primary dispenser 3.

Therefore, for example, the movement means 2 may be constituted by a succession of pans or trays, with a curved bottom or in any case with a lowered portion, forming indeed the seat 6.

Hereinafter, instead, the detailed description of a different constructive option for the movement means 2, of particular practical interest (and also for this reason corresponding to what is shown in the accompanying figures) and in any case provided with resting seats 6 in stable equilibrium, will be provided.

In any case, by virtue of the choice to place the products A on the movement means 2 in stable equilibrium, downstream of the primary dispensers 3 such products A are assuredly returned along the predefined trajectory B and therefore it is possible to know precisely their position in the end section of the conveyance and measurement station 1, so that it is easier to manage their passage to the downstream sections.

The parameter that represents the extent of the deviation that is actually measured in the conveyance and measurement station 1 can be any, without thereby abandoning the protective scope claimed herein (and the parameters might also be two or more).

In particular, this parameter is chosen between the maximum distance reached by the product A, due to the deviation imposed by the jet, with respect to the predefined trajectory B, and, preferably, the breadth of the angle formed by the broken line that approximates the real trajectory C followed by each product A due to the deviation imposed by the jet.

It should be noted that by virtue of the action of the jet (if suitably oriented), the product A can move transversely, in a temporary manner, on the support offered by the movement means 2; if therefore the predefined trajectory B is (preferably) rectilinear, the real trajectory C (which is shown for the sake of simplicity only in FIG. 2 and only for one primary dispenser 3) will differ from the former due to the presence of a kind of more or less rounded cusp, which gives the real trajectory C (approximately) the shape of a broken line and the breadth of the angle of which can indeed be measured, said breadth being greater for more substantial movements (and lighter products A).

It is specified that the term "trajectory" (be it the predefined one B or the real one C) used here with reference to the products A has the meaning that physics or classical mechanics assign to it, when indeed it is associated with a solid (not punctiform) body: the trajectory of the product A is the trajectory of its center of mass.

In an embodiment of considerable practical interest, cited by way of non-limiting example of the application of the disclosure, the conveyance and measurement station 1 comprises at least one primary dispenser 3 of pressurized fluid, which is arranged with at least one first nozzle 3a for the emission of the jet laterally adjacent to the predefined trajectory B (laterally adjacent to the movement means 2 and the products A in transit), and at least one auxiliary dispenser 7 of pressurized fluid, located proximate to the primary dispenser 3 and arranged with at least one second nozzle 7a for the emission of the jet below the predefined trajectory B (and below the products A in transit).

Obviously, the terms "above", "below" and "laterally adjacent" (or the like) are to be understood in relation to the imaginary plane on which the whole conveyance and measurement station 1 rests.

The primary dispenser 3 has in fact the task of moving/diverting the product A transversely in transit (in order to allow the desired measurement of the deviation) and therefore it is arranged at the same vertical level as the products A (for a horizontal jet) or also a partially different one (for an inclined jet). The auxiliary dispenser 7 (chosen preferably of the same type as the primary dispenser 3) has instead the task of slightly lifting and separating said product A, reducing friction and adherence to the movement means 2 and facilitating indeed transverse movement.

Even more particularly, the conveyance and measurement station 1 comprises two (or even more) primary dispensers 3, arranged offset and (preferably) on opposite sides of the predefined trajectory B, and two (or even more) auxiliary dispensers 7, arranged proximate to respective primary dispensers 3.

Preferably, where a number greater than one of primary dispensers 3 and/or auxiliary dispensers 7 is provided, they are chosen substantially of the same type and therefore the remarks made here in relation to "one" dispenser 3, 7 must be understood preferably to be extended to "all" the dispensers 3, 7.

The choice to arrange two or more primary dispensers 3 along the predefined trajectory B allows to replicate the measurement and therefore to obtain a more precise and accurate estimate, reducing the margin of error.

Usefully, the apparatus 4 (or other electronic system mounted on the conveyance and measurement station 1 and in any case cooperating with the apparatus 4) is configured (also) to measure the dimensions of each horticultural product A in transit.

It has been shown that the extent of the displacement is correlated with the weight and/or specific gravity of the product A: specific gravity obviously is also correlated with the volume and generally with the dimensions of the product A, and therefore by acquiring information also on the dimensions it is possible to obtain a more accurate measurement, particularly if products A that have very heterogeneous dimensions are to be circulated along the conveyance and measurement station 1.

In other words, if the simple measurement of the extent of the deviation can already be indicative of the specific gravity of the product A (and therefore of any flaws in the growth of the kernel of the nuts), also in the case of products A having different dimensions the measurement of the dimensions allows to obtain an even more precise and accurate estimate of the specific gravity of the product A; this information can indeed in turn be very useful for a correct identification of flaws and of the incorrect growth of the kernel in particular.

In an embodiment of considerable practical interest, which is shown in the accompanying figures by way of non-limiting example of the application of the disclosure, the movement means 2 comprise a succession of axially symmetrical supporting elements 8 which are moved by a respective movement assembly (and typically rotate about their own longitudinal axis D). One of such elements 8 is in particular the subject of FIGS. 4-7: as can be seen, in practice it is a sort of roller with a particular shape.

In greater detail, the assembly comprises a chain 9 which supports (and moves) along at least one side (thereof) the elements 8. The chain 9 is typically wound (and slidingly movable) on itself to form in practice a closed path imposed on the elements 8: a portion of said path corresponds therefore to the predefined trajectory B of the products A.

The chain 9 (but it might be a belt or other still) is therefore responsible for the traction of the elements 8 along the closed path, while their rotation about the respective longitudinal axes D can be imparted according to known methods.

Even more particularly, the movement and support means 2 can comprise two (or even more) successions of axially symmetrical elements 8 (which are movable parallel to each other), which are supported by the chain 9 at respective sides (of said chain 9).

The accompanying figures show schematically a possible example of a portion of chain 9: the person skilled in the art may easily complete it and integrate it with the other components necessary for its operation (providing for example a motor adapted to rotate a sprocket around which said chain 9 is wound and engaged, so as to indeed move the chain).

With further reference to the solution of the accompanying figures, each element 8 has a circular transverse cross-section with a diameter that increases progressively towards the ends, so as to resemble the contour of two mutually opposite frustums (or an hourglass). Moreover, each element 8 is arranged with the longitudinal axis of symmetry D (the one about which it can indeed rotate, shown in FIGS. 4 and 5), which is at right angles to the predefined trajectory B. In this manner, each horticultural product A can be arranged so as to rest on a pair of consecutive elements 8 (suspended over the interspace defined between them, which obviously is chosen of a size adequate to prevent the products A from falling below).

The interspace between the consecutive elements 8, at the middle region (where the elements 8 have a smaller cross-section), and the respective overlying region constitutes therefore, in the preferred embodiment, the resting seat 6 in stable equilibrium. The thrust imposed by the jet is preferably oriented so as to move the product A parallel to the longitudinal axes D, directing it towards the ends of the elements 8 (without making it fall). In any case, the contour of the elements 8 is such that it returns the products A towards the center of the interspace by gravity, once it has passed the region affected by the jet.

Each element 8 can cooperate both with the preceding element and with the following element for resting respective products A (thus helping to form two respective seats 6), maximizing the conveyance capacity. Likewise, it can be assumed that an element 8 cooperates only with the one that precedes it or follows it, for example in order to maintain a greater distance between the products A in transit.

Usefully, each element 8 has, along the lateral surface, a plurality of substantially longitudinal protrusions 10. The protrusions 10 facilitate the rotation of the product A (often made necessary for the acquisition of other data of interest) following the rotation of said elements 8 about the respective longitudinal axes D. In known solutions, this result is obtained by arranging a superficial rubber coating on the external surface of the rollers on which the products rest: the rubber coating increases friction and therefore indeed facilitates rotation. This choice (which can be adopted in any case also for the station according to the disclosure) might however hinder the deviation of the product A in the conveyance and measurement station 1, and for this reason the protrusions 10 are (preferably) provided. The protrusions 10 can be ribs (as in the preferred solution of the accompanying figures), teeth or any other feature that in a more or less regular and continuous manner rises from the lateral surface 3a with a substantially longitudinal orientation (i.e., with an orientation that is parallel to the respective longitudinal axis D or is inclined with respect to it by a few degrees).

As noted, the protective scope claimed herein extends to any use of the conveyance and measurement station 1 in systems for processing or moving products A of any type and for any purpose (particularly, obviously, whenever it is required or desirable to be able to acquire information on weight, specific gravity and flaws otherwise not detectable in a simple and quick manner).

At the same time, a subject matter of the present disclosure and of the protection claimed herein is a specific type of apparatus 100 for the processing of horticultural products A, which allows indeed to enhance the particularities of the conveyance and measurement station 1.

Therefore, in particular, the apparatus 100 comprises in series (along a movement line) at least one loading station 110, data acquisition means 120 and a selective unloading station 130.

The loading station 110 is configured to feed a movement and processing line with an unsorted mass of horticultural products A.

Typically, the products A arrive directly from harvesting fields (or from previous pre-processing systems), and are unloaded onto the line, indeed at the loading station 110, in an unsorted manner, that is, regardless of their size, shape, color, degree of ripeness, etcetera.

The data acquisition means 120 are arranged along the line downstream of the loading station 110 cited above and are configured for the acquisition of information related to at least one data item of interest of each horticultural product A in transit and for the transmission of said information to an electronic control and management system.

The electronic system can be of any type, and for example can be a control unit or a computer; typically, in any case, it is the same electronic system that controls the operation of the entire apparatus 100 (and the apparatus 4).

The selective unloading station 130 is in turn arranged along the line (downstream of the data acquisition means 120) and is configured to convey in a selective manner each horticultural product A in transit toward one of at least two distinct collection stations (where baskets, crates, vats or containers of another type can be arranged), on the basis of commands issued by the electronic system as a function of the information acquired at least by the data acquisition means 120.

So far, in any case, the apparatus 100 is of a known type and can be assembled and integrated with other components or functions, drawing on common industry expertise.

According to the disclosure, therefore, the data acquisition means 120 comprise a conveyance and measurement station 1 according to one or more of the preceding claims, which is arranged along the line upstream of at least the unloading station 130.

In greater detail, first of all in the unloading station 130 the products A are assigned to different collecting stations indeed as a function of the measurement performed in the conveyance and measurement station 1. Thus, each station accommodates exclusively nuts (or other products A) having the same (range of) weight/specific gravity.

As an alternative, the acquisition means 120 comprise at least one other device 140 configured to measure another data item of interest of the product A (color, shape, size, sugar grade, degree of ripeness, defectiveness, etcetera) and the data item is used for the selection of the most appropriate collection station (each one of the stations accommodates all and only the products A for which the measured data item assumes a predefined value or falls within a predefined range).

Figure 8:
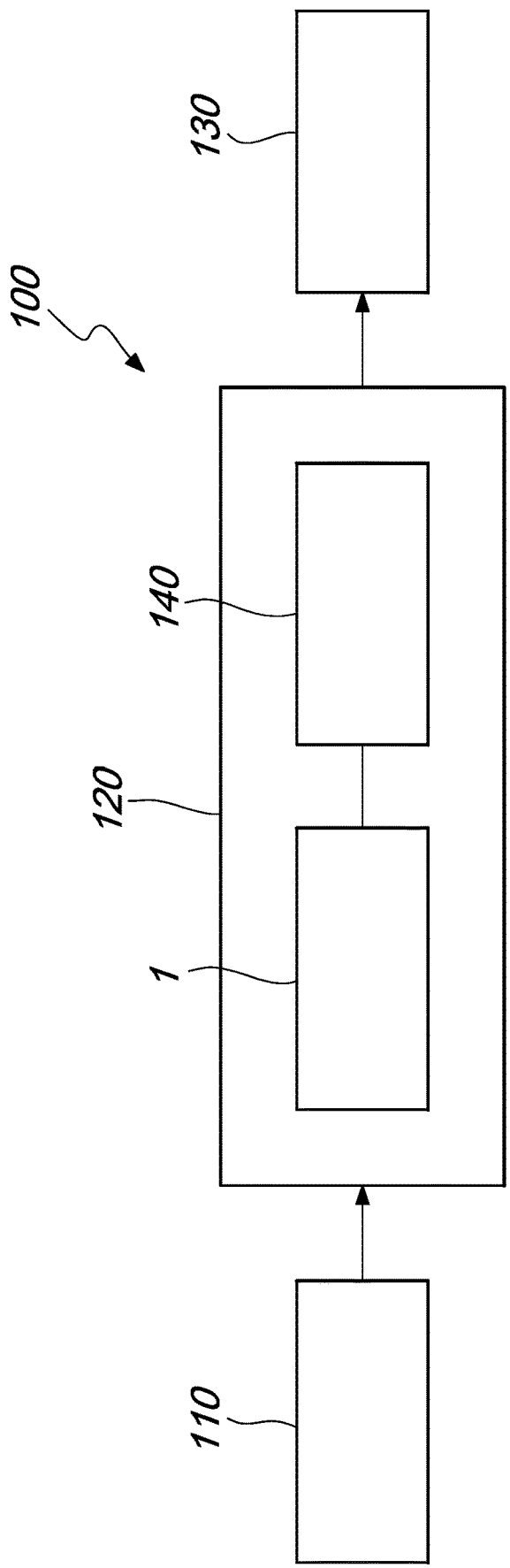
FIG. 8 is a block diagram showing in summary the configuration of an apparatus provided with the station of FIG. 1.

Even better, both acquired information items (the one of the conveyance and measurement station 1 and the one of the device 140) are used to choose the collection station. Or also, more simply, the conveyance and measurement station 1 can be used for a preliminary selection, in order to expel from the line all the products A that are clearly defective because they have a significantly lower weight than expected, or in any case in order to accumulate the products in a separate collection station. In this last case, the conveyance and measurement station 1 can be arranged in any location of the line, upstream or downstream of the other device 140 (which in any case can also be integrated in the conveyance and measurement station 1 and/or in the apparatus 4). FIG. 8 schematically shows simply a possible example of application in this regard.

The operation of the conveyance and measurement station (and of the apparatus) according to the disclosure is evident from what has been shown so far.

In particular, it is noted that the products A can be deposited one by one (according to various methods) on the elements 8 (on the movement means 2), so that they are simply rested on the interspace between two of them (which are consecutive).

As the elements 8 move the products A downstream, they are intercepted by the jet that arrives from the primary dispenser 3, which forces a (preferably temporary) deviation from the predefined trajectory B (which is imposed by the movement means 2 and is typically rectilinear).

In a fully particular manner, the conveyance and measurement station 1 is capable of measuring or at least estimating the weight and/or specific gravity of the nuts (or other products A) in transit by measuring indeed at least one parameter which represents the extent of the deviation imposed by the jet.

The (lateral) deviation is imposed in particular by the primary dispenser 3 (or by each primary dispenser 3, if it is preferred to perform the measurement several times, at different points of the line), with a jet that is transverse to the predefined trajectory B (and directed horizontally or only slightly inclined with respect to the horizontal plane on which the trajectory B lies) with the aid of the respective auxiliary dispenser 7, which instead generates an upward jet and thus slightly lifts the product A, reducing friction.

The protrusions 10 do not contrast the displacement (which in practice is oriented parallel to them) and instead facilitate, along the normal transit of the products A, the rotation of the products, which is imparted by the elements 8 that rotate in turn (for example, in order to expose the entire surface to a video camera, for a variety of purposes).

In practice it has been found that the conveyance and measurement station (and of course the apparatus) according to the disclosure fully achieve the intended aim and objects, since the measurement of the extent of the deviation imposed on the nuts by virtue of the jet that arrives from the primary dispenser 3 allows to identify quickly and accurately an erroneous growth of the kernel, since this circumstance results in a lower weight/specific gravity of the nut and therefore in a greater deviation than expected for a nut of good quality (with a fully developed kernel).

In order to manage this information in the most appropriate manner, the apparatus 4 or in any case the electronic control system (of the conveyance and measurement station 1 or of the apparatus 100) may optionally be provided with instructions for comparing the deviation with the one expected for an intact nut and/or with instructions for associating greater or smaller deviations with corresponding values of the weight and/or specific gravity of the product A. More simply, it is left up to the user of the conveyance and measurement station 1 and/or of the apparatus 100 to set the ranges of deviation values (and therefore of weight/specific gravity) deemed acceptable and to set the various ranges of values to which the conveyance to one collection station rather than another should correspond.

More generally, therefore, by virtue of the cooperation of the primary dispenser 3 and of the apparatus 4, the disclosure allows to weigh nuts and other horticultural products A while ensuring speed and adequate precision in measurement, with a structurally simple solution. In fact, the speed is ensured by the fact that the weighing operations do not hinder nor lengthen in any way the path imposed on the products A along the line (they merely temporarily "perturb" the predefined trajectory B). At the same time, this solution can be implemented simply by arranging dispensers 3, 7 along the line (along the predefined trajectory B) and an electronic video camera or other apparatus 4, therefore in a manner that is undoubtedly simple and free from structural complications (and therefore also economical).

Clearly, the weighing thus obtained represents not only a potential downstream sorting criterion but also useful information for easily identifying flaws otherwise not easily detectable in nuts and other horticultural products A.

The disclosure thus conceived is susceptible of numerous modifications and variations, all of which are within the scope of the appended claims; all the details may furthermore be replaced with other technically equivalent elements.

In the embodiments shown, individual characteristics, given in relation to specific examples, may actually be replaced with other different characteristics that exist in other embodiments.

In practice, the materials used, as well as the dimensions, may be any according to the requirements and the state of the art.

The invention claimed is:

1. A station for conveyance and measurement of horticultural products, comprising movement and support means for movement and support, along a predefined trajectory, of a plurality of horticultural products, which can be arranged in series so that they rest on said movement and support means with a resting arrangement defining a resting surface on said movement and support means of said horticultural products which are only partially hindered with respect to said resting surface, further comprising at least one primary dispenser of pressurized fluid, configured to direct a continuous or intermittent jet of the fluid toward said predefined trajectory, and an apparatus for measuring at least one parameter which represents an extent of deviation imposed by the jet on each product in transit, with respect to said predefined trajectory of said horticultural products with respect to said resting surface on said movement and support means of said horticultural products, for a consequent indirect measurement of a weight and/or of a specific gravity of the respective product, correlated with the extent of the deviation.

2. The station according to claim 1, wherein said apparatus comprises at least one electronic vision device, provided with instructions for an analysis of acquired images, aimed at measuring said at least one parameter.

3. The station according to claim 1, wherein said parameter is chosen between a maximum distance reached by the product, due to the deviation imposed by the jet, with respect to said predefined trajectory, and a breadth of an angle formed by a broken line that approximates a real trajectory followed by each product due to the deviation imposed by the jet.

4. An apparatus for the processing of horticultural products, comprising in series at least:
 a loading station configured for feeding a movement and processing line with an unsorted mass of horticultural products;
 data acquisition means, arranged along said line and configured for an acquisition of information related to at least one data item of interest of each horticultural product in transit and for a transmission of said information to an electronic control and management system;
 a selective unloading station, which is arranged along said line and is configured for the selective conveyance of each horticultural product in transit toward one of at least two distinct collection stations, on the basis of commands imparted by said electronic control and management system as a function of at least some of the information items acquired by said data acquisition means; and
 wherein said data acquisition means comprise a conveyance and measurement station according to claim 1, which is arranged along said line upstream of at least said unloading station.

5. A station for conveyance and measurement of horticultural products, comprising movement and support means for movement and support, along a predefined trajectory, of a plurality of horticultural products, which can be arranged in series so that they rest on said movement and support means, further comprising at least one primary dispenser of pressurized fluid, configured to direct a continuous or intermittent jet of the fluid toward said predefined trajectory, and an apparatus for measuring at least one parameter which represents an extent of deviation imposed by the jet on each product in transit, with respect to said predefined trajectory, for a consequent indirect measurement of a weight and/or of a specific gravity of the respective product, correlated with the extent of the deviation, wherein said movement and support means form resting seats in stable equilibrium for the horticultural products, said at least one primary dispenser being configured to impose with the respective jet a temporary deviation from said predefined trajectory.

6. A station for conveyance and measurement of horticultural products, comprising movement and support means for movement and support, along a predefined trajectory, of a plurality of horticultural products, which can be arranged in series so that they rest on said movement and support means, further comprising at least one primary dispenser of pressurized fluid, configured to direct a continuous or intermittent jet of the fluid toward said predefined trajectory, and an apparatus for measuring at least one parameter which represents an extent of deviation imposed by the jet on each product in transit, with respect to said predefined trajectory, for a consequent indirect measurement of a weight and/or of a specific gravity of the respective product, correlated with the extent of the deviation, the station further comprising at least one said primary dispenser of pressurized fluid, arranged with at least one first nozzle for the emission of the jet to a side of said predefined trajectory, and at least one auxiliary dispenser of pressurized fluid, placed proximate to said primary dispenser and arranged with at least one second nozzle for an emission of the jet below said predefined trajectory.

7. The station according to claim 6, further comprising two said primary dispensers, which are arranged so as to be offset on opposite sides of said predefined trajectory, and two said auxiliary dispensers, arranged proximate to respective said primary dispensers.

8. A station for conveyance and measurement of horticultural products, comprising movement and support means for movement and support, along a predefined trajectory, of a plurality of horticultural products, which can be arranged in series so that they rest on said movement and support means, further comprising at least one primary dispenser of pressurized fluid, configured to direct a continuous or intermittent jet of the fluid toward said predefined trajectory, and an apparatus for measuring at least one parameter which represents an extent of deviation imposed by the jet on each product in transit, with respect to said predefined trajectory, for a consequent indirect measurement of a weight and/or of a specific gravity of the respective product, correlated with the extent of the deviation, wherein said apparatus is configured to measure dimensions of each horticultural product in transit.

9. A station for conveyance and measurement of horticultural products, comprising movement and support means for movement and support, along a predefined trajectory, of a plurality of horticultural products, which can be arranged in series so that they rest on said movement and support means, further comprising at least one primary dispenser of pressurized fluid, configured to direct a continuous or intermittent jet of the fluid toward said predefined trajectory, and an apparatus for measuring at least one parameter which represents an extent of deviation imposed by the jet on each product in transit, with respect to said predefined trajectory, for a consequent indirect measurement of a weight and/or of a specific gravity of the respective product, correlated with the extent of the deviation, wherein said movement and support means comprise a succession of axially symmetrical supporting elements which are moved by a respective movement assembly, each one of said axially symmetrical supporting elements having a circular transverse cross-section with a diameter that increases progressively towards ends thereof, so as to resemble a contour of two mutually opposite frustums, and being arranged with a longitudinal axis of symmetry which is perpendicular to said predefined trajectory, each horticultural product being arrangeable so as to rest on a pair of said consecutive axially symmetrical supporting elements.

10. The station according to claim 9, wherein each one of said axially symmetrical supporting elements has, along a lateral surface, a plurality of substantially longitudinal protrusions.

\* \* \* \* \*